United States Patent [19]
Leiber

[11] 3,907,378
[45] Sept. 23, 1975

[54] METHOD AND DEVICE FOR MONITORING THE ACTION OF AN ANTILOCK CONTROLLER

[75] Inventor: Heinz Leiber, Leimen, Germany

[73] Assignee: Teldix GmbH, Heidelberg, Germany

[22] Filed: Nov. 27, 1973

[21] Appl. No.: 419,292

[30] Foreign Application Priority Data
Nov. 29, 1972   Germany............................ 2258317
Mar. 20, 1973   Germany............................ 2313763

[52] U.S. Cl................................ 303/21 AF; 340/53
[51] Int. Cl.² ......................................... B60T 8/00
[58] Field of Search ................. 188/181; 303/20, 21; 340/53, 62, 52 B, 409–410

[56] References Cited
UNITED STATES PATENTS

| | | | |
|---|---|---|---|
| 3,578,819 | 5/1971 | Atkins............................. | 303/21 BE |
| 3,656,816 | 4/1972 | Schlitz et al........................ | 303/21 P |
| 3,656,817 | 4/1972 | Okamoto et al.................... | 303/21 P |
| 3,740,103 | 6/1973 | Sweet et al. ................ | 303/21 AF X |
| 3,776,604 | 12/1973 | Doya et al. ...................... | 303/21 EB |
| 3,782,783 | 1/1974 | Jones................................. | 303/21 P |
| 3,797,892 | 3/1974 | Leiber.............................. | 303/21 EB |

*Primary Examiner*—Trygve M. Blix
*Assistant Examiner*—Stephen G. Kunin
*Attorney, Agent, or Firm*—Spencer & Kaye

[57] ABSTRACT

A method for monitoring the action of an antilock controller comprises initiating a check procedure for the controller with at least one wheel disconnected therefrom, determining whether controlled braking or uncontrolled braking is most efficient and rendering at least part of the antilock controller non-operative for a predetermined period if normal braking is found to be most efficient. Also provided is a monitoring device which operates according to this method.

24 Claims, 6 Drawing Figures

METHOD AND DEVICE FOR MONITORING THE ACTION OF AN ANTILOCK CONTROLLER

BACKGROUND OF THE INVENTION

The invention relates to a method and a device for monitoring the action of an antilock controller of a vehicle, by means of which controller the brake pressure is varied, in the sense of providing an optimal braking with regard to at least some of the wheels of the vehicle when there is a tendency to lock, in dependence on the signals obtained at the wheels depending on the rotary movement behavior thereof.

As is well known, an antilock controller should monitor the locking of vehicle wheels. This is effected in that, with a tendency of at least one wheel to lock, as determined by means of sensors, e.g. by measuring the wheel's deceleration and/or slip, the controller prevents a further increase in the brake pressure and a reduction of the brake pressure is initiated. As a result of the further behavior of the wheel, a control of the brake pressure is carried out which makes lock-free optimal braking possible.

The control of the brake pressure is, in the case of one known type of controller, effected by means of control valves connected to the brake line, which valves occasionally allow brake fluid to flow out into a return line. In another controller concept using valves, a piston is displaced in dependence on the tendency to lock and on moving from its starting position, first closes a valve in the brake line and thereafter provides an increased volume for the brake fluid remaining between this valve and the wheel brake cylinder.

There are two cases in which, in spite of the provision of an antilock controller, a stopping distance for the vehicle can occur which is longer than that which would take place with normal uncontrolled braking. In the first case, because of errors occurring in the sensors and/or electronic evaluation units, a pressure reduction is effected in error, although no tendency to lock is present. With this, the action of each brake can be interrupted even for relatively long periods. For this reason it is necessary to monitor the controller. The second case, in which such an extension of the stopping distance occurs, is when driving in deep snow, on sand or on roads with a thin ice layer or loose chippings.

SUMMARY OF THE INVENTION

It is an object of the invention to create a possibility when using antilock controllers, of reducing extensively at least the extensions of the stopping distance resulting from driving on certain road surfaces.

According to a first aspect of the invention, there is provided a method for monitoring the action of an antilock controller for control of the brake pressure at the wheels of a vehicle comprising initiating a check operation for said antilock controller with at least one vehicle wheel braking system disconnected from said controller determining with the aid of said at least one vehicle wheel whether controlled braking or uncontrolled braking is most efficient and rendering said antilock braking controller non-operative at least in part and for a predetermined period if normal braking is found to be most efficient.

According to a second aspect of the invention, there is provided a device for monitoring the action of an antilock controller for control of the brake pressure at the wheels of a vehicle comprising initiating means for initiating a check operation for said antilock controller, disconnection means associated with said initiating means for disconnecting a braking system of at least one wheel of said vehicle from said antilock controller, determining means for determining with the aid of said at least one vehicle wheel whether braking control by said antilock controller or normal braking is most efficient, and switch-off means for rendering said antilock controller non-operative at least in part and for a predetermined period on a signal from said determining means indicating that normal braking is most efficient.

BRIEF DESCRIPTION OF THE DRAWINGS

The invention will now be described in greater detail, by way of example, with reference to the drawings in which.

DESCRIPTION OF THE PREFERRED EMBODIMENTS

In a preferred form of embodiment of the invention both of the above-described cases in which a stopping distance extension occurs are detected and an extension of the stopping distance as compared with normal braking is prevented or reduced. In the case of this embodiment, a monitoring element which is completely independent of the controller function is used and the movement behaviour of the vehicle is sequentially determined in the case of controlled operation and in the case of momentarily uncontrolled brake pressure at at least one wheel, and thus, eventually, momentarily locked wheel (or wheels). Then, if the braking action in the latter case is greater, an error in the controller or a corresponding road surface is assumed and, at least for a period, the controller is made at least partially inoperative. Thus it can be ensured that a defective controller is switched off in good time and independently of the source of the error. Switching off only for a predetermined period is advisable, because even in the case of acceptable controller operation, with particular road surface conditions (chippings, deep snow and so on) an impaired braking action occurs and this is detected. In this case a final switching off would be inadvisable. While in these circumstances the controlled switch-off will be undertaken at as many wheels as possible in order to obtain as short as possible a braking distance, however it is sensible in order to maintain the steerability and lateral stability of the vehicle to operate at least one wheel in a controlled manner.

The determination of whether a better braking action occurs with control or with switched-off control can be carried out by determining the many varied measured values. The most favorable is to measure the deceleration of the vehicle itself by means of a corresponding sensor mounted on the vehicle. However the vehicle speed can also be determined, e.g. by means of known optical systems (e.g. as in the case of British Pat. No. 1,249,302) or using an unbraked wheel or in other known ways. The brake behavior can be deduced from speed changes within predetermined time periods in the different operational states, one after the other. Also a measurement of the path travelled in a certain time provides a criterion for the braking action, but here, if necessary, the vehicle speed change must further be taken into account. Finally also the different variations in the vehicle deceleration can be determined in the two operational states and, from this, deductions can be made as to which state provides the better braking action.

Preferably then, if it is determined that better braking action takes place during operation of the controller, a further initiation of a check operation is prevented, at least for a time, if necessary up to the end of the braking operation. An exception to this, however, can be made if the vehicle deceleration is reduced by a predetermined value. This could indicate a defect. In order that a check operation is not initiated as a result of the momentary deceleration changes, as can occur in the case of uneven or winding roadways and even in other ways, it is preferably determined whether this reduction of deceleration lasts for a predetermined time.

In accordance with another embodiment of the invention, in which the braking distance is shortened in the case of the above-mentioned road surface, measuring means are provided which, following locking of at least one wheel because of switching off control, become operative and determine the acceleration behavior of the locked wheel with a reduction in brake pressure. If the acceleration of the wheel is between about 0.5 and about 2 g, conditions are present in which a better braking with locked wheels is achieved. Correspondingly in the case of these acceleration conditions, a signal is produced and an interruption of the control takes place at several wheels, but, on account of the lateral stability, not at all wheels. Here, instead of the actual acceleration, the jerk, that is to say, the change in acceleration, can be detected and a signal which is to be used for interrupting the control can be produced, if the acceleration increase does not take place at a predetermined rate. In the case of this described embodiment (in which wheel acceleration measurement is used) the knowledge is taken into account that the above mentioned roadway conditions, which cause an extension of the braking distance lie at a $\mu$ approximately between 0.1 and 0.5. In the case of such $\mu$-values, the wheel reacceleration is between 0.5 and 2 g. In this embodiment the situation with regard to better braking action is not determined directly but through measurement of the wheel acceleration.

The above-described measurement of the wheel reacceleration and the prior switching off of the control at one wheel, necessary therefor, can be initiated e.g. in the case of each response of the controller and then at certain time intervals again and again. In accordance with a further form of the invention, this initiation is made dependent on whether such road conditions are to be expected, i.e. first a measured value is obtained, which indicates such a $\mu$ (0.1–0.5) and then the check operation described is initiated by this measured value. Such a measured value can be produced by a vehicle deceleration signal generator in the case of decelerations of the vehicle between 0.2 and 0.5 g; however such a triggered signal can be produced also by a pressure sensor which measures the controlled brake pressure, since the brake pressure is in fact dependent on $\mu$ in the control operation. As a result of the check operation initiated by these signals it is subsequently checked whether the expected conditions are actually present.

If the other above-described measuring method (comparison of the vehicle deceleration values) is desired to be used only for preventing extensions of the braking distance in the case of the described roadway conditions, then, also in the case of this measuring method, the initiation of the check operation can be made dependent on the occurrence of such a measured value. In a favorable manner this measured value can be allowed to occur for a predetermined time (e.g. 300 msec.) in both cases before the check operation is initiated.

It is favorable (when going around a curve) to prevent or delay the initiation of the check operation when the steering wheel is turned through a predetermined angle $\alpha$ or if a certain rate of change $\alpha\cdot$ of the steering wheel angle takes place. These signals ($\alpha$ and $\alpha\cdot$) can also be used to initiate a new check operation earlier than normal in the case of a negative test result with resultant switching off of the controller. Again a monitoring device can be provided, as shown in the examples, for the monitoring of the safety system itself.

Finally the initiation of the check operation can be made dependent on whether, in addition to the response of the controller, complete braking is present, for which the rise in the vehicle deceleration or the brake actuation rate can be used. Thus it is possible, for example, to initiate the check operation with a slow pressure rise, if control signals are derived from a wheel. It is also possible to initiate the check operation with the occurrence of one control signal and in so doing keep the brake pressure constant at all wheels except the test wheel.

The determination of the vehicle deceleration has the additional advantage that the deceleration values can also be indicated and stored, the stored value being cleared again only in the case of a certain speed being attained. The deceleration can be used as strong evidence in the case of an accident.

The time for the check operation can also be made variable, e.g. be made dependent on the vehicle deceleration or the vehicle speed in such a manner that the length of the operation decreases with increasing value.

Furthermore it is favorable to design the deceleration signal generator in such a manner that the increase of the output voltage increases less with increasing vehicle deceleration.

Figure 1:
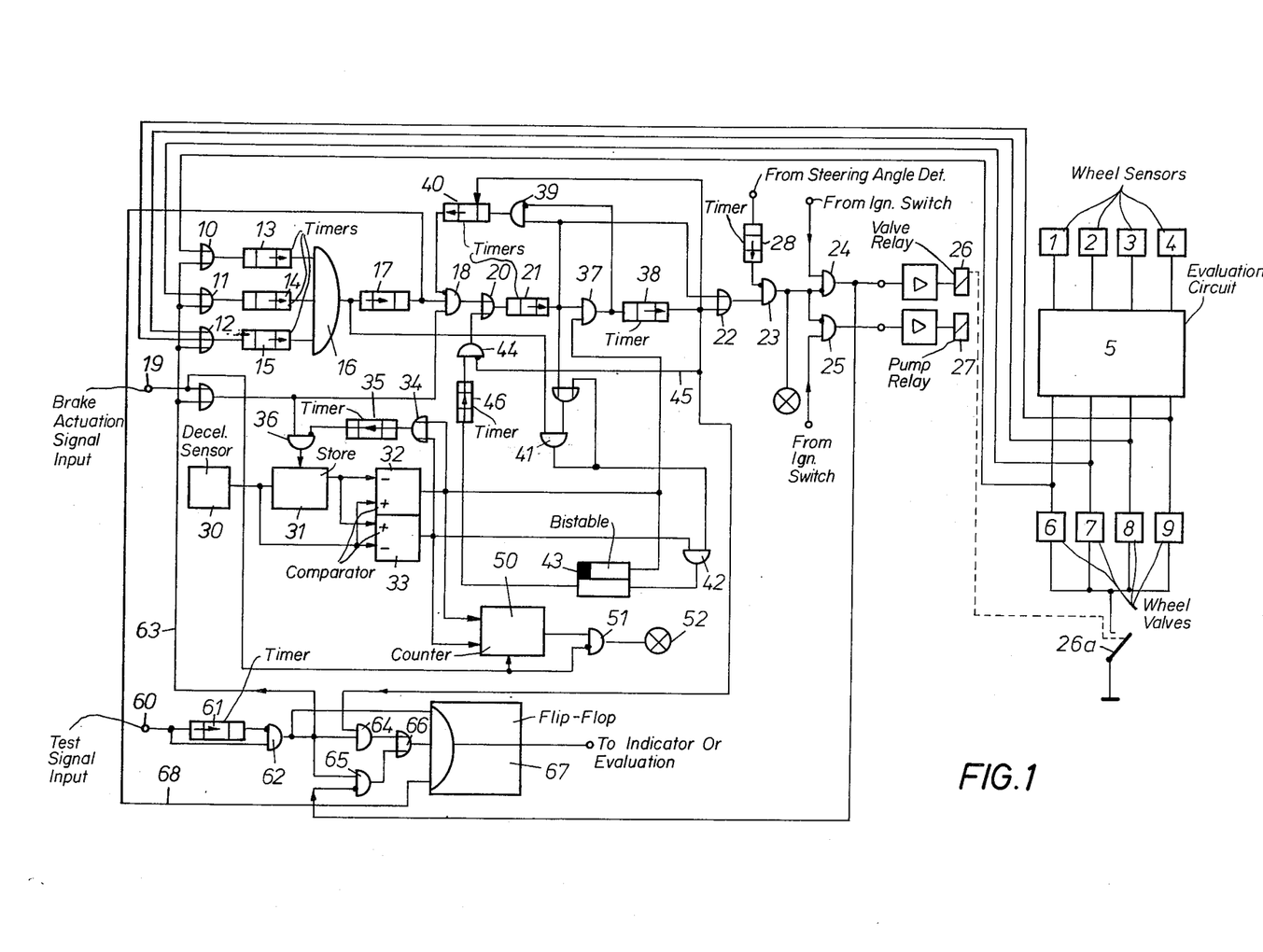
FIG. 1 shows diagrammatically a first embodiment of the invention.

Referring now to the drawings, FIG. 1 shows, schematically, a lock controller which comprises four wheel sensors 1 to 4, an evaluation circuit 5 for these signals and four brake control valves 6 to 9 for brake pressure variation. The lines leading to the valves (e.g. inlet valves) 6 and 7 of the two non-driven wheels are connected by means of OR-gates 10 and 11 to time elements 13 and 14 extending the incoming signals (e.g. 150 msec.). The control lines leading to the valves 8 and 9 of the rear wheels are connected by means of an OR-gate 12 to a corresponding time element 15. If, within a period of 150 msec. the two front wheel valves and at least one rear wheel valve are energized, that is to say, the controller has responded, then AND-gate 16 emits a signal which initiates a check operation. This signal passes through time element 17 with a delay of e.g. 200 msec. to the AND-gate 18 and, when the brake is actuated (signal at a terminal 19) passes further through OR-gate 20 and a time element 21 extending the signal, e.g. by 50 msec. The time element 17 ensures that the controller has operated for 200 msec. before the signal at the output of the time element 21 blocks gates 24 and 25 by way of OR-gate 22 and AND-gate 23 whose negated input is connected to the output of a time element 28. These gates 24 and 25 are connected to the control line for the valve relay 26 or pump relay 27. These relays are energized, for example, on actuating the ignition lock. Relay 26 then connects the valves 6 to 9 to earth by means of its contact 26a so that it can be energized by the control. Correspondingly a contact (not shown) in the drive circuit of the return flow pump is closed by the relay 27. Energization of each valve is thus eliminated for at least 50 msec. (time element 21) with the blocking of the gates 24 and 25 and thus a pressure build-up to a high level is effected which can cause the wheels to lock.

Here a deceleration sensor 30, for example, producing an analogue voltage output is provided on the body of the vehicle. This sensor supplies a signal, which corresponds to the vehicle deceleration, to a store 31 and two comparators 32 and 33. The store 31 is fixed on actuation of the brake (signal at terminal 19), i.e. from this point in time, it stores the vehicle deceleration which was instantaneously present. If the deceleration increases further and the instantaneous deceleration exceeds the stored deceleration by a value predetermined by the comparator 32, then the output signal of the comparator 32 fixes, by means of an OR-gate 34, time element 35 (e.g. delay of 3 ms) and AND-gate 36, the store 31 at the new instantaneous deceleration value. On expiry of the 200 ms of the time element 17, thus at the beginning of the second part of the check operation, the store 31 has stored the last reached deceleration value in the control operation. Now, if in subsequent phases without control, a further corresponding increase of the vehicle deceleration takes place, then the gate 37 is opened for the signal at the output of the time element 21 by the output pulse which then appears and thus the control remains switched off on account of the time element 38 with, for example, 2 sec. signal extension, for this time.

Simultaneously store 31 is reset which, however, is not important here.

With the occurrence of the output signal of the time element 21, that is to say, at the beginning of the second part of the check operation, if a better brake action is achieved by the control, initiation of a further check operation at this time is prevented by means of the AND-gate 39 and the time element 40 (with signal extension of e.g. 3 sec.). So that this time does not start if the controller switches off, the time element 40 is cleared upon the response of the time element 38. Since, on the other hand, with a holding output signal of the AND-gate 16 (controller operation), the AND-gate 41 is opened at the appearance of an output signal from the time element 21 and is then itself kept open as long as control operation is effective (thus the controller is not switched off), the gate 42 is prepared for an output signal of the comparator 33, which produces an output signal when the deceleration falls below the stored deceleration to a predetermined extent, that is to say, if the deceleration becomes worse. The output signal of the gate 42 changes over the bistable stage 43 which then, after a delay of 500 msec. (time element 46 for filtering) initiates a new check cycle through the AND-gate 44 and OR-gate 22 (line 45), it being assumed that the controller is not switched off.

FIG. 1 shows two possible monitoring circuits together. In one a counter 50 is provided which counts the pulses in the case of a deceleration increase and deceleration reduction, which pulses are fed in at the forwards or backwards counter input. If the stages of the comparators 32 and 33 are of the same size, then the counter state must be 0 at the end of the braking. If a signal deviating from 0 is present at the end of braking, then a warning lamp 52 is lighted through AND-gate 51. The resetting of the counter 50 takes place at the beginning of a new braking operation.

In the case of another embodiment of the monitoring circuit, a signal is fed to the terminal 60 before the start of a journey. A signal, which initiates a check operation over a line 63, appears at the output of the AND-gate 62 for 500 msec. as a result of the delay time element 61 (500 msec.). A check is made at the AND-gate 64 as to whether, within this 500 msec., a signal arrives at the output of the AND-gate 37, which must not be the case with correct functioning. On the other hand, the signal at the output of the AND-gate 24 must not be suppressed, which fact is determined at the AND-gate 65. Thus, at the output of the OR-gate 66, no signal must arise, otherwise presence of such a signal will be indicated by means of the element 67 or will switch off the circuit. Here it can be additionally checked whether the output signal of the time element 17 produce a signal with the correct timing (line 68).

Figure 2:
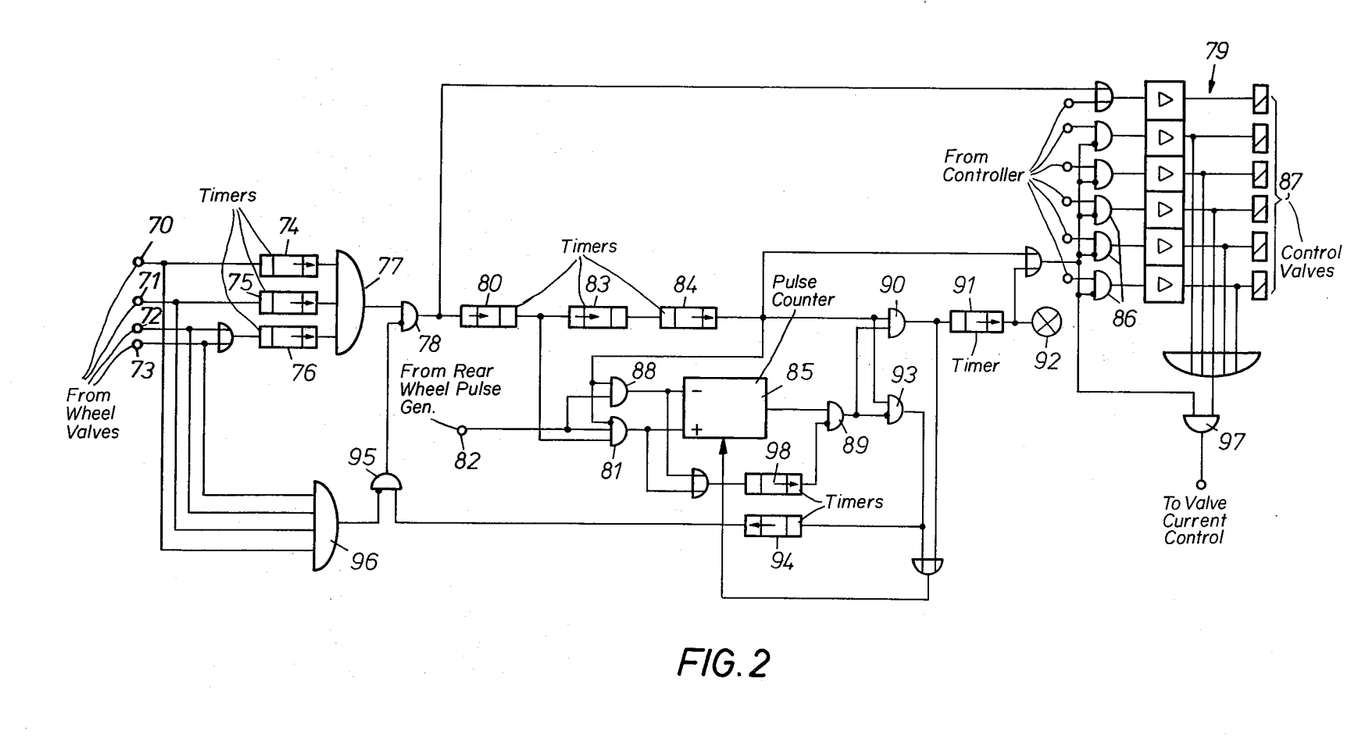
FIG. 2 shows diagrammatically a second embodiment of the invention.

FIG. 2 shows another embodiment for carrying out the method in accordance with the invention. The lines coming from the four valves are given the reference numerals 70 to 73. As in FIG. 1, here too the signals are fed by way of time elements 74 to 76 to an AND-gate 77, which initiates the check operation, when the valves for the wheels on the front axle and a valve for a wheel on the rear axle responds within a predetermined time. The output signal of the AND-gate 77 passes by way of another AND-gate 78 to the control valve 79, for example, of the left-hand rear wheel and there allows the pressure to drop, so that this wheel is practically unbraked and thus can suitably be used for measuring the speed of the vehicle. On expiry of the delay time of a time element 80 (e.g. 100 msec.), a gate 81 is opened by the output signal of the time element 80 to pass pulses from the pulse generator or the left-hand rear wheel which are fed in at 82. The pulse frequency of the pulse sequence is proportional to the rotary speed of the left rear wheel and thus to the vehicle speed. A time element 83 corresponds to the time element 80 (100 msec. delay), whereas a time element 84 extends the signal (100 msec). The pulses of the pulse generator of the left-hand rear wheel are fed to the forwards counting input of a pulse counter 85, subject to the effect of the time elements 80, 83 and 84, and thus for 100 msec. after the reduction of the brake pressure at the left-hand rear wheel. After the 100 msec. delay (time element 83) gates 86 are blocked for 100 msec. on the one hand to prevent passage of control signals to other valves 87, that is to say makes the control inoperative and, on the other hand, in this time the pulses of the pulse generator 82 are fed by means of a gate 88 to the backwards counting input of the counter 85 and the other input is blocked at the same time. As long as input pulses arrive at the counter 85, its output is blocked by means of a time extending element 98 (10 msec.), i.e. AND-gate 89 opens shortly after the storage of the last pulse. The fed-in pulse numbers correspond to the distances travelled. If the number of pulses fed to the backwards counting input is less than the number at the forward counting input by a predetermined amount, that is to say the distance travelled in the 100 msec. in the case of non-controlled wheels is less by a amount greater than the speed decrease which has taken place in the meantime — then a signal is emitted from the counter, which opens the AND-gate 90 and thus acts on the time element 91 which effects a blocking of the valve control for, e.g. 2 seconds and the switching on of the warning lamp 92.

With the initiation of the blocking of the valve control or if no output signal of the counter 85 appears at the end of the output signal of the time element 84, the counter is reset by means of AND-gates 93. The last named signal, which indicates that the controller is in order or that the existing road surface is not such as to extend the braking distance, also sets the time element 94 in operation, which blocks the gate 78 and prevents initiation of a new operation for a period of, for example, 1 second through AND-gate 95. If all the valves are energized at once (that is to say also valve 79), then a defect has occurred. In this case a check operation is initiated immediately, for which the blocking of the gate 78 is cancelled by means of the voltage from the AND-gate 95 through the output signal of the AND-gate 96.

If one of the valves 87 is energized, although a blocking signal for the control of these valves is applied, then this is indicated by the output of gate 97 and/or the valve current is switched off.

Figure 3:
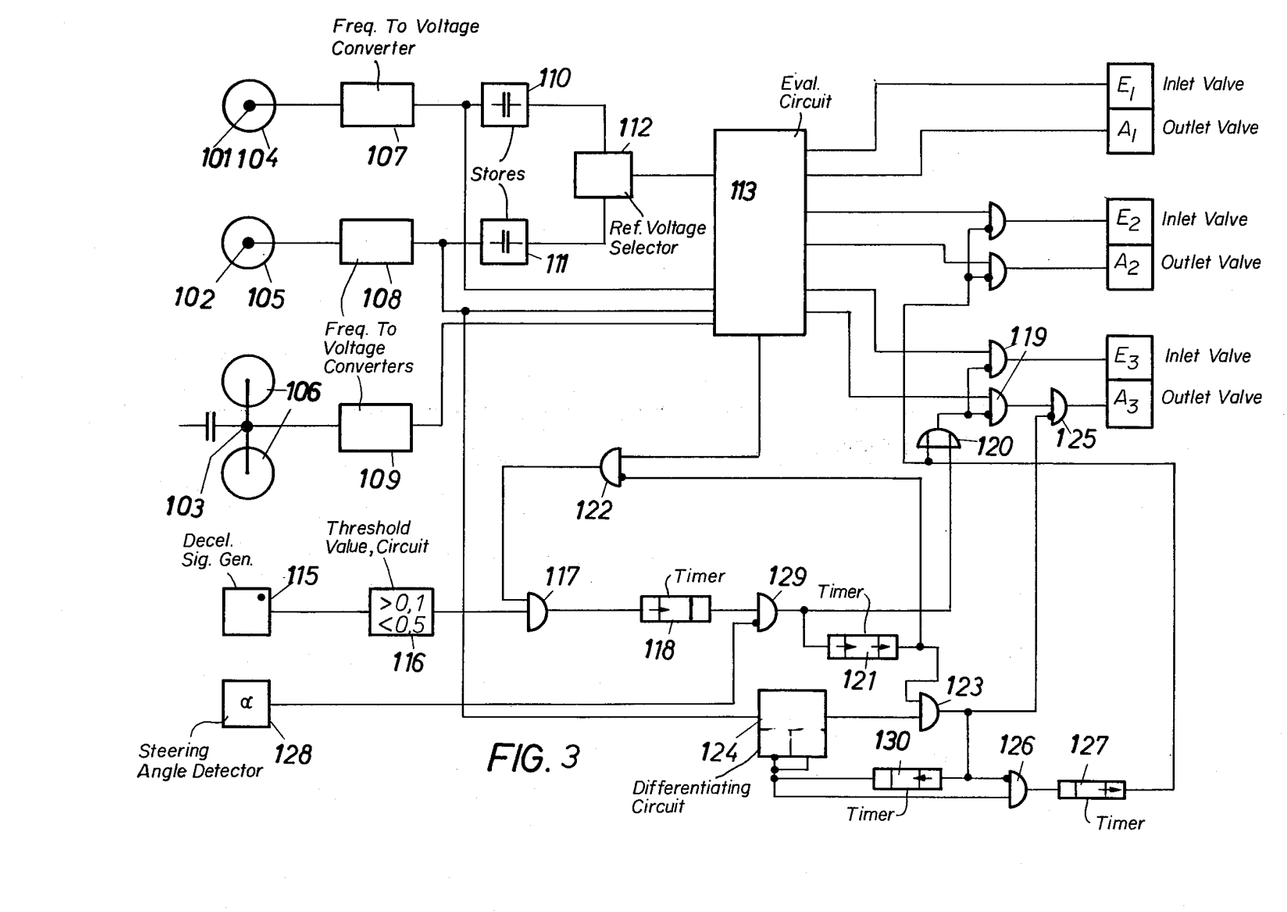
FIG. 3 shows diagrammatically a third embodiment of the invention.

In the case of the embodiment of FIG. 3, the two sensors of the front wheels, 104 and 105, are given the reference numerals 101 and 102 and the common sensor for the rear wheels 106 is given the reference numeral 103. The pulse sequences of these sensors are converted into voltages proportional to the wheel speeds in converters 107, 108 and 109. In the two storage elements 110 and 111, which e.g. are always charged up to the applied voltage, but discharged at predetermined rate, voltages corresponding approximately to the vehicle speed are obtained, of which in each case the greater of these is selected in the element 112. This reference value as well as the three voltages corresponding to the wheel speeds are fed to the evaluation circuit 113. From the fed-in signals are obtained switching signals for the inlet valves $E_1$ to $E_3$ and for the outlet valves $A_1$ to $A_3$ associated with the sensors 101 to 103.

The type of control in itself is not important for the invention. Here a mixed control using slip signals and deceleration/acceleration signals were used. Here, too, it is not important whether — as shown — a plurality of control channels are present or whether the sensor signals arrive one after the other for evaluation by means of a single channel.

The controller so far described operates completely adequately in most cases. However, at a certain $\mu$, it entails an extension of the braking distance. A vehicle deceleration signal generator 115 is provided to give an improvement in this respect. After this signal generator, a threshold value stage 116 is connected, which stage produces a signal if the vehicle deceleration is between 0.1 and 0.5 g. On the assumption that a complete braking is present and the controller operates, an AND-gate 117 is kept open by the evaluator 113 for passage of the output signal of the stage 116. A time element 118 causes a delay of its input signal by $T_1$, e.g. 300 msec. The output signal of the time element 118 passes, by way of the OR-gate 120 to AND-gate 119 and prevents energization of the valves $E_1$ and $A_2$ of the wheel 102 for the purpose of brake pressure control. The output signal of the time element 118 however passes to the time element 121, which produces an output signal after a time $T_2$ (e.g. 200 msec). This output signal cuts off the input signal of the time element 118 and thus its output signal, by means of the AND-gate 122 with inverted input for the length $T_3$ of this signal (e.g. 200 msec).

Figure 4:
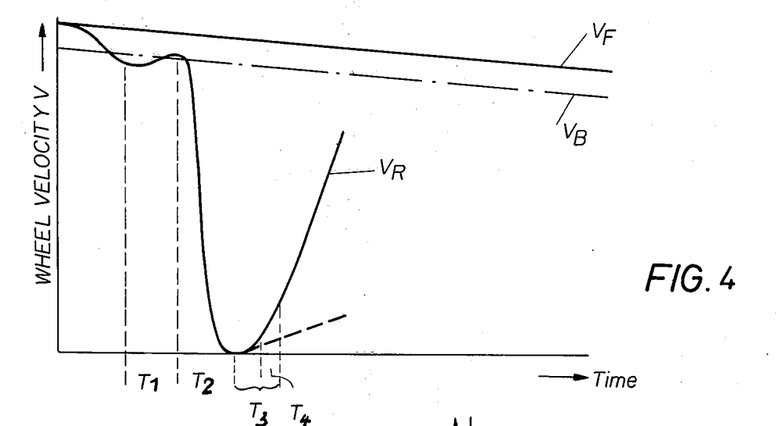
FIG. 4 is a graph showing various speeds plotted against time for explaining the embodiment of FIG. 3.
Figure 5:
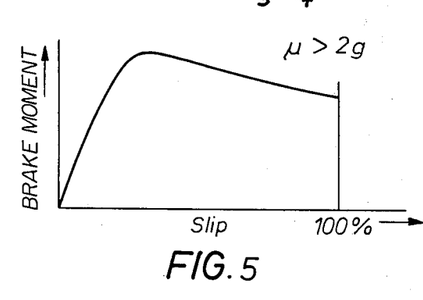
FIG. 5 is a graph showing the dependency of the brake moment on slip for a $\mu$-value corresponding to accelerations greater than 2g.
Figure 6:
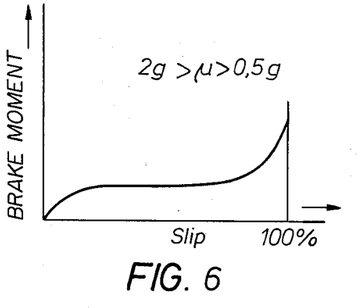
FIG. 6 is a graph similar to FIG. 5 but showing the situation for a $\mu$-value corresponding to accelerations between 0.5g and 2g.

With the apparatus sofar described, the following operation is carried out:

The controller remains in operation up to the expiry of the delay time $T_1$ of the element 118. Thereafter a pressure rise takes place because control is prevented in the time period $T_2$. This causes the wheel to lock. Since from the appearance of the output signal of the time element 121 the input signal of the time element 118 disappears, the control again becomes operative at the brake of the wheel 102 and the pressure is reduced. With this, reacceleration of the wheel begins shortly after the end of the time period $T_2$ as FIG. 4 shows. Now it is checked how this reacceleration takes place. If a relatively high $\mu$ is present (greater than 2 g), then the wheel speed will follow the plotted curvature of $V_R$, on the other hand in the case of a $\mu$ smaller than 2 g but greater than 0.5g, the wheel speed will follow approximately the broken curve. The dependency of the brake moment B on slip $\lambda$ is shown in FIGS. 4 and 5 relating to these $\mu$-values. It will be immediately obvious that, in the case of a small value for $\mu$, a relatively larger braking moment is present when the wheel is locked. The mode of writing $2 g > \mu > 0.5$ used in these Figures indicates the presence of a $\mu$ corresponding to a reacceleration between 0.5 and 2 g.

For sensing which $\mu$ is present, the output signal of the element 121 of the length $T_3$ (e.g. 200 msec) is fed to the gate 123. This gate then permits the passage of output signals of a differentiating element 124, to which differentiating element is fed a voltage corresponding to the wheel speed of the wheel 105 and produces the output signal in the basic position, if the acceleration of the wheel 105 is above 0.5 g. This output signal is fed to AND-gate 125 in order to effect the maintainance of a constant pressure in this period. Simultaneously the output signal of the AND-gate 123 causes, with a small delay of about $T_4$ (e.g. 20 msec) caused by the time element 130, a switchover of the differentiating element 124 to its high threshold of 2 g, so that the output signal of the differentiating element is retained only if the acceleration of the wheel has increased in the time $T_4$ to 2 g. If the output signal of the differentiator 124 and thus that of the AND-gate 123 disappears, then, on account of the inverted input of the AND-gate 126 this latter will be open for passage of the output signal of the time element 130. Its momentary output signal is extended in the time element 127 to e.g. 1 sec. and now blocks in this time the effect of the control on the valves $E_2$, $A_2$ and $E_3$, $A_3$ so that the wheels 105 and 106 are locked. This locking becomes operative if, within a time span $T_4$ the threshold of 2 g is not exceeded, that is to say a wheel acceleration is present, which corresponds approximately to the curve of FIG. 4. The braking distance is shortened by the locking of the wheels 105 and 106 and the steerability and lateral stability is maintained by the wheel 104. In accordance with another embodiment, one wheel can be allowed to rotate on each axle and the others caused to be locked. Since when travelling round a curve, a high lateral stability is required, the occurrence of momentary locking more than once is prevented by the element for detecting the steering angle 128, which emits a signal at a certain angle, and the AND-gate 129.

It will be understood that the above description of the present invention is susceptible to various modification changes and adaptations.

What is claimed is:

1. A method for monitoring the action of an antilock controller for control of the brake pressure at the wheels of a vehicle comprising initiating a check operation for said antilock controller, with at least one vehicle wheel braking system disconnected from said controller determining with the aid of said at least one vehicle wheel whether controlled braking or uncontrolled braking is most efficient, and rendering said antilock controller non-operative at least in part and for a predetermined time period if normal braking is found to be most efficient.

2. A method as defined in claim 1, and comprising determining the movement behavior of the vehicle during a said checking operation alternately with said controller in operation and which at least partial switching off of said controller and determining from the values obtained from said movement behavior of said vehicle whether greater braking action occurs with the controller in operation or with at least partial switching off of said controller.

3. A method as defined in claim 2, and comprising determining the deceleration of said vehicle at sequentially following time points, at one time point with the controller in operation and at the other time point with at least a partially switched off controller, comparing the two values thus obtained and using said comparison as a criterion for switching off said controller.

4. A method as defined in claim 2, and comprising determining the decrease in speed of said vehicle at sequentially following time periods, at one with operation of the controller and at the other with at least a partially switched off state of the controller, comparing the two values thus obtained and using said comparison as a criterion for switch off said controller.

5. A method as defined in claim 2, and comprising determining the distance travelled by said vehicle within two time periods, in one time period with operation of the controller and in the other with at least a partially switched off controller, comparing the two values thus obtained and using said comparison as a criterion for switching off said controller.

6. A method as defined in claim 1, and comprising preventing, at least for a predetermined time period, initiation of a further check operation if greater braking is found with controller operation.

7. A method as defined in claim 6, and comprising initiating a further checking operation during this time period if the deceleration of said vehicle has dropped to a predetermined value.

8. A method as defined in claim 7, and comprising initiating said further checking operation only if said deceleration of said vehicle drops to said predetermined value for a predetermined time period.

9. A method as defined in claim 1, and comprising measuring the acceleration behaviour of a wheel momentarily uncontrolled by said controller to produce a signal if the acceleration of said wheel has not reached a predetermined value indicating a high frictional coefficient of a surface on which said wheel is running and using this said signal for interruption of the control for a predetermined time period at one or more said wheels.

10. A method as defined in claim 9, wherein said signal is produced if said acceleration of said wheel has not reached 2 g.

11. A method as defined in claim 9, and comprising producing said signal only if a predetermined low acceleration of said wheel is exceeded.

12. A method as defined in claim 9, and comprising measuring the acceleration of said wheel.

13. A method as defined in claim 9, and comprising forming a jerk signal derived from acceleration with respect to time.

14. A method as defined in claim 1, and comprising measuring the frictional coefficient of a surface on which said vehicle is travelling to produce a signal if said frictional coefficient is less than 0.5 and initiating a check operation only on occurrence of this said signal.

15. A method as defined in claim 14, and comprising initiating said check operation only if the deceleration of said vehicle does not reach a predetermined value.

16. A method as defined in claim 14, and comprising initiating said check operation if a predetermined brake pressure is not exceeded.

17. A method as defined in claim 1, and comprising preventing a at least partial switching off of said controller if turning of a steering wheel of said vehicle exceeds a predetermined angle.

18. A method as defined in claim 1, and comprising preventing a at least partial switching off of said controller if turning of a steering wheel of said vehicle exceeds a predetermined rate of angular movement.

19. A method as defined in claim 1, and comprising initiating said check operation from time to time and checking the correct functioning of said check operation.

20. A method as defined in claim 19, and comprising initiating a said checking operation when the vehicle motor is started.

21. A method as defined in claim 19, and comprising detecting the appearance or non-appearance of signals at certain circuit points at certain times after initiation of said check operation for checking purposes.

22. A device for montioring the action of an antilock controller for control of the brake pressure at the wheels of a vehicle comprising initiating means for initiating a check operation for said antilock controller, disconnection means associated with said initiating means for disconnecting a braking system of at least one wheel of said vehicle from said antilock controller, determining means for determining with the aid of said at least one vehicle wheel whether braking control by said antilock controller or normal braking is most efficient, and switch off means for rendering said antilock controller non-operative at least in part and for a predetermined time period on receipt of a signal from said determining means indicating that normal braking is most efficient.

23. A device as defined in claim 22, and comprising sensors for determining the movement behavior of said vehicle during said check operation alternately when said antilock controller is in operation and when it is at least partially switched off, and evaluating means for evaluating from values obtained from said sensors the relative efficiency of braking with control and without control.

24. A device as defined in claim 22, and comprising measuring means for measuring the acceleration of a wheel of said vehicle which is momentarily switched off from the antilock controller, signal producing means for producing a signal in response to the said measuring means if said acceleration of said wheel has not reached a predetermined value indicative of a high coefficient of friction of a surface on which said wheel is running and switch off means responsive to said signal from said signal producing means for making said antilock controller ineffective for a predetermined time period at one or more of said wheels.

* * * * *